United States Patent [19]

Grant, Jr. et al.

[11] 4,069,704
[45] Jan. 24, 1978

[54] VARIABLE LENGTH ENCAPSULATING PRESSURE DROP TESTER

[75] Inventors: James William Grant, Jr.; Scott Brown Coble, Jr., both of Charlotte, N.C.

[73] Assignee: Celanese Corporation, Charlotte, N.C.

[21] Appl. No.: 689,756

[22] Filed: May 25, 1976

[51] Int. Cl.² ...................... G01M 3/02; G01N 15/08
[52] U.S. Cl. ......................................... 73/38; 73/41.0; 73/49.2
[58] Field of Search ................. 73/38, 49.2, 49.1, 45.4, 73/41

[56] References Cited

U.S. PATENT DOCUMENTS

| 2,951,364 | 9/1960 | Sherrill | 73/49.1 X |
| 3,115,767 | 12/1963 | Tyrrell et al. | 73/38 |
| 3,258,117 | 6/1966 | Domeck, Jr. et al. | 73/38 |
| 3,564,902 | 2/1971 | Heitmann | 73/38 X |
| 3,769,832 | 11/1973 | Baier | 73/38 X |
| 3,889,523 | 6/1975 | Nolte | 73/49.2 |

Primary Examiner—Daniel M. Yasich
Attorney, Agent, or Firm—Robert J. Blanke

[57] ABSTRACT

An apparatus for testing tobacco smoke filter rods and similar articles of varying lengths for pressure drop across the opposed ends of a rod encapsulated in an air-impervious sleeve comprising a housing having a longitudinal bore, a rod receptacle having an air-impervious encapsulating sleeve mount therein, slideably mounted in the bore, a hollow rod stop stationarily mounted in the bore and extending into the sleeve of the rod receptacle, means for expanding the air-impervious sleeve, vacuum means communicating with the hollow interior of the rod stop and means for measuring the pressure drop interposed between the vacuum means and the hollow rod stop.

8 Claims, 5 Drawing Figures

VARIABLE LENGTH ENCAPSULATING PRESSURE DROP TESTER

BACKGROUND OF THE INVENTION

1. Field of the Invention

This invention concerns improvements in testing the pressure drop across tobacco smoke filters and smiliar rodshaped, fluid permeable articles. More particularly, this invention relates to an apparatus for testing the pressure drop across encapsulated rods of varying lengths.

2. Description of the Prior Art

In producing a cigarette with desirable physical characteristics and properties, one of the most important factors that must be taken into account is the ease with which smoke can be drawn through the cigarette.

A cigarette which is difficult to draw is ordinarily unacceptable to a smoker while one with little draw resistance will ordinarily result in increased burning and faster entry of hot smoke into the smoker's mouth with possible unpleasant irritations.

In the production of a filter cigarette, a filtering material is interposed between the smoke producing tobacco column and the smoker's mouth to remove various allegedly harmful ingredients in the smoke. The filtering material, however significantly effects the overall porosity of the entire cigarette. In fact, in the average case, the filter, while occupying about one-fifth of the overall cigarette length, accounts for one-third to three-quarters of the resistance to draw of the entire cigarette. It is therefore critical to the production of an acceptable filter cigarette to consistently produce a filter in which the ability to retain such smoke ingredients as tar and nicotine is precisely balanced against the ease of draw.

In cigarettes, the air flow is laminar. Consequently, the flow is proportional to the pressure difference across the ends of a cigarette or likewise a filter rod. This enables porosity, expressed in cubic centimeters per second at a constant pressure, to be easily correlated with pressure differences found at a standard flow rate. Accordingly, an accepted approach to measuring porosity of filter or cigarette rods entails a measurement of the prssure difference required to produce a given constant air flow rate. A simple apparatus to accomplish this measurement typically comprises a receptacle in the form of a tube to accommodate at least a portion of the rod, a vacuum source to draw air through the rod and a manometer to measure the reduced pressure which results from the pressure drop across the rod.

In addition to reflecting the ease with which air may be drawn through the rod the pressure drop measurement may alsp be used to estimate the weight of tow or other filtering material being utilized in the rod and to monitor the taste and chemical parameters of the filter.

As a result, pressure drop is often used as a primary control unit of measure in the production of tobacco smoke filters with tolerances in the range of ± 0.5 inches of water. Utilization of the simple pressure drop apparatus described above for such control has been found to be unsatisfactory because of the varying porosity of the cigarette paper or other wrapping material for the rod which permits varying amounts of air to be pulled radially into the filter in addition to the primary axial flow of air.

To eliminate the radial air flow the pressure drop apparatus of the prior art is provided with a rod receptacle tube sufficiently long to accommodate the entire length of the rod to be tested with a flexible sleeve mounted within the receptacle to form an air-tight seal around the length of the rod. This type of apparatus is generally referred to as an "encapsulating" pressure drop apparatus.

The encapsulating pressure drop apparatus proved satisfactory and highly successful for many years. However, in recent years there has been an explosive proliferation of cigarette brands which, in many cases, are differenciated merely by variations in the configuration or length of the filter attached to the tobacco column. Unfortunately, such prior art pressure drop measuring apparatus is designed primarily for one standard length tobacco smoke filter rod. In order to carry out pressure drop measurements on varying length filter rods stop rods must be fabricated to insert in the filter rod receptacle of the pressure drop measurement apparatus to compensate for the variation in length between the rod being tested and the conventional rod length.

While the use of rod stops does permit the utilization of a conventional encapsulating pressure drop apparatus in testing rods of varying lengths, the use of the stops presents other problems.

Initially, individual rod stops must be fabricated for each variation in filter length. Additionally, the rod stops have to be inserted in the rod receptacle tube prior to insertion of the filter rod making retrieval of the stop from the far end of the tube difficult when it is necessary to change to a stop of a different length to test filters of a different length.

SUMMARY OF THE INVENTION

We have now invented an apparatus for testing the encapsulated pressure drop across the ends of tobacco smoke filters and similar rod-shaped, fluid permeable articles which is readily adjustable to accommodate rods of varying lengths.

Broadly stated the apparatus of the invention comprises a. a housing member having a longitudinal bore communicating with opposite ends of said housing, b. a first hollow member slideably mounted in one end of said longitudinal bore, c. an extensible, air-impervious sleeve mounted in said first hollow member, d. a second hollow member stationarily mounted in the second end of said longitudinal bore and extending into said bore and said sleeve of said first hollow member, e. means to expand said air-impervious sleeve, f. vacuum means communicating with said second hollow member, g. means for measuring pressure drop interposed between said vacuum means and said second hollow member.

BRIEF DESCRIPTION OF THE DRAWING

Other aspects of the invention will appear in the following detailed description and appended claims, reference being made to the accompanying drawing forming a part of the specification.

DESCRIPTION OF THE PREFERRED EMBODIMENTS

Figure 1:
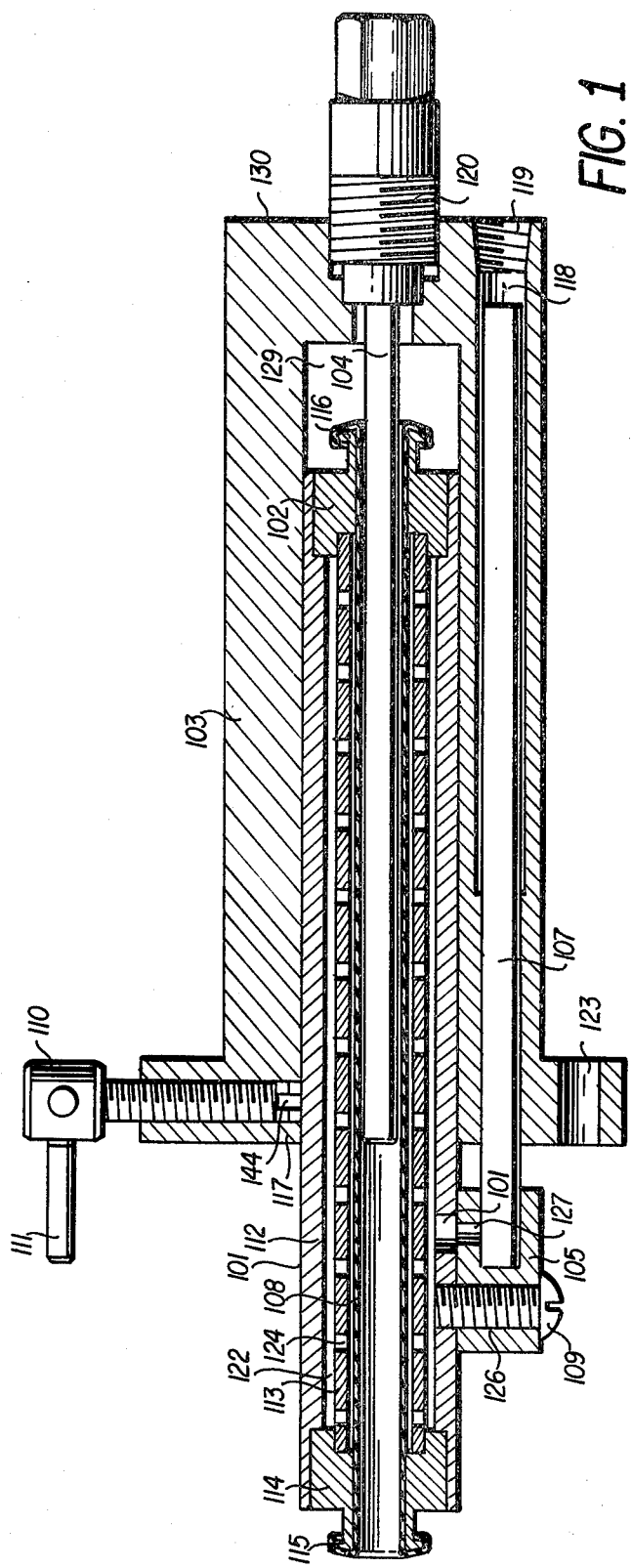
FIG. 1 is a longitudinal section of the apparatus of this invention.
Figure 2:
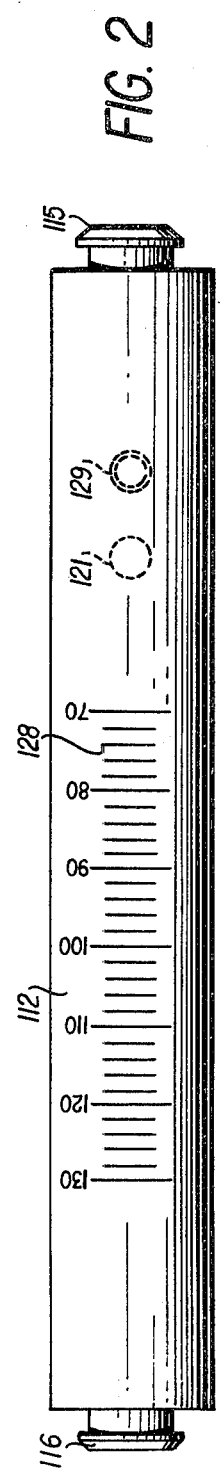
FIG. 2 is a front elevation view of the encapsulating rod receptacle member of the apparatus of FIG. 1 showing the calibration for varying rod lengths.

The apparatus which is shown in FIGS. 1 and 2 comprises a housing 103 having an enlarged front face 117, a main longitudinal bore 129 extending between and communicating with the enlarged front face 117 and the rear face 130 of the housing, a vacuum tube passageway 118 extending longitudinally through the housing between the front and rear faces and adapted for a pneumatic connection 119 at the rear face, a radial bore 144 extending through the enlarged front face 117 of the housing to the main longitudinal bore 129, the radial bore being provided with internal threads which mate with the external threads of a locking screw 110 which is operated by means of a handle 111. The enlarged front face of the housing 117 is also provided with longitudinal bores 123 to permit mounting of the housing 103 to a support structure, not shown.

An encapsulating rod receptacle 112 is slideably mounted in the main longitudinal bore 129 of the housing. The encapsulating rod receptacle comprises an outer gauge tube 101 bearing calibration marks 128 on its outer surface and an inner vacuum spool 113 with numerous radial apertures 124 uniformly distributed over the length of the spool. The outer gauge tube 101 and the vacuum spool 113 are maintained in coaxial, space apart relationship to define a hollow chamber 122 there between by end adaptors 114, 102 mounted in the outer guage tube 101. The adaptors 114, 102 are both provided with outwardly extending flanges ends 115, 116. An extendible, air-impervious encapsulating sleeve 108 is mounted within the vacuum spool 113 by stretching the ends of the sleeve over and around the flanged ends 115, 116 of the adaptors 114, 102.

The outer gauge tube 101 of the encapsulating rod receptacle 112 is further provided with a threaded bore 126 for mounting of the vacuum block head 105 by means of a screw 109. The vacuum block head 105 is provided with a vacuum tube 107 slideably mounted in and communicating with the vacuum tube passageway 118 extending longitudinally through the housing 103.

The outer gauge tube 101 of the encapsulating rod receptacle 112 is further provided with a vacuum inlet 121 communicating at the inner surface of the gauge tube 101 with the hollow chamber 122 between the gauge tube and the apertured vacuum spool 113 and at the outer surface of the gauge tube with a vacuum passageway 127 in the vacuum block head 105 which opens into the vacuum tube 107.

A rod stop 104 comprising a hollow cylindrical tube approximating in diameter the diameter of the rods to be tested is stationarily mounted in the main longitudinal bore 129 at the rear face 130 of the housing 103. The rod stop 104 extends the length of the main longitudinal bore 129 slideably fitting within the extended air-impervious sleeve 108 of the encapsulating rod receptacle 112 and extending to the front face 117 of the housing 103. The inside of the rod stop 104 communicates with a vacuum source, not shown, through a pneumatic connection 120 also mounted in the rear face 130 of the housing 103.

In operation, the apparatus of this invention utilizes controlled vacuum sources at both pneumatic connections 119, 120 of the encapsulating apparatus. A pressure drop measuring means is interposed between the pneumatic connection 120 to the rod stop 104 and its vacuum source. The controlled vacuum sources used at the pneumatic connections 119, 120 may be two independent sources or one vacuum source operated alternatively to each of the connections as will be more fully described below as part of the description of the operation of the apparatus.

Figure 5:
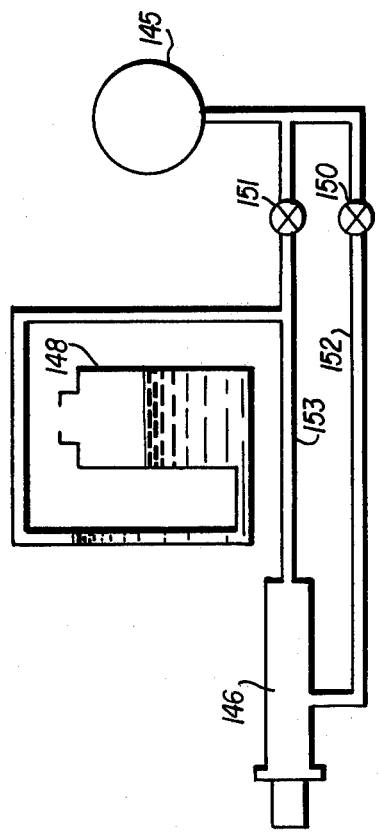
FIG. 5 represents the pneumatic circuitry of the apparatus.

FIG. 5 illustrates the preferred pneumatic circuitry for the operation of the variable length encapsulating pressure drop testing apparatus of this invention. In this embodiment both pneumatic connections 119, 120 of the variable length encapsulating unit 146 are connected to a single vacuum source 145 through alternate vacuum lines 152, 153. Each line is equipped with a regulating means 150, 151. A manometer 148 is interposed in pressure drop measurement line 153 between the vacuum source 145 and the pneumatic connection 120 to the rod stop 104.

A further understanding and appreciation of the invention can be obtained by considering the following description of the operation of the apparatus in measuring the pressure drop across the ends of a tobacco smoke filter rod or similar rod shaped, fluid permeable articles.

The operation of the apparatus generally comprises the steps of:
1. adjustment of the encapsulating rod receptacle to accommodate the length of the rod being tested;
2. insertion and encapsulation of the rod in the apparatus;
3. subjection of the rod to a standard flow rate of air by application of a vacuum and recordation of the measured pressure drop.
4. release and removal of the rod.

The adjustment of the encapsulating rod receptacle to accommodate the length of the rod being tested is accomplished by screwing the lock screw 110 out of the radial bore 144 of the housing face 117 so that it is out of contact with the outer gauge tube 101 of the rod receptacle 112 and then subjecting the outer surface of the extendible air-impervious encapsulating sleeve 108 to a suction force by opening the encapsulator operating valve 150 to the vacuum source 145 which operates to apply suction sequentially through the vacuum source line 152, the pneumatic connection 119, the vacuum tube passageway 118, the vacuum tube 107, the passageway in the vacuum head 127, the vacuum inlet 121 in the gauge tube 101, the hollow chamber 122 between the gauge tube and vacuum spool, and the radial apertures 124 of the vacuum spool 113 which results in the expansion of the air-impervious sleeve 108 against the associated surfaces of the vacuum spool 113. This allows the slideable movement of the entire encapsulating rod receptacle 112 in the longitudinal bore 129 relative to both the rod stop 104 and the housing face 117 to provide the appropriate available encapsulating length within the rod receptacle 112 for the rod being tested. This length is the distance between the exposed end of the rod receptacle, as at the flanged end 115 of the adaptor 114, and the outer end of the rod stop 104. As the rod receptacle is moved into the housing this length is decreased, as the receptacle is moved out of the housing this length is increased. In practice this length should be somewhat shorted than the actual length of the rod being tested to allow for the encapsulation of all but a small portion of the rod which protrudes from the receptacle to facilitate removal of the rod.

The outer surface of the gauge tube 101 may be calibrated 128 to indicate the available encapsulating length within the rod receptacle for various positions of the rod receptacle in the housing so that when a calibration is aligned with the surface of the enlarged face 117 of the housing a corresponding encapsulating length will be available within the rod receptacle.

After the rod receptacle has been correctly positioned in the bore 129 for the length of rod being tested the lock screw 110 is screwed into contact with the outer gauge tube 101 of the rod receptacle 112 to maintain it in the desired position.

The rod then inserted into the extended air-impervious sleeve 108 of the rod receptacle 112 until it abuts the rod stop 104. The encapsulator operating valve 150 is then closed removing the suction and subjecting the extendible, air-impervious sleeve 108 to atmospheric pressure which results in its contraction against the rod being tested and the rod stop 104 to provide an air-tight seal along the entire length of the encapsulating rod receptacle.

To obtain the pressure drop measurement the pressure drop operating means 151 is opened subjecting the length of the rod being tested to a standard flow rate of air by suction acting through the vacuum source line 153, the pneumatic connection 120 and the rod stop 104 causing the pressure drop to be measured at the interposed manometer 148. After the pressure drop has been measured the pressure drop operating means 151 is closed and the encapsulator operating valve 150 opened which again operates to apply suction sequentially through the vacuum source line 152, the pneumatic connection 119, the vacuum tube passageway 118, the vacuum tube 107, the passageway in the vacuum head 127, the vacuum inlet 121 in the gauge tube 112, the hollow chamber 122 between the gauge tube and vacuum spool, and the radial appertures 124 of the vacuum spool 113 resulting in the expansion of the air-impervious sleeve 108 against the associated surfaces of the vacuum spool 113 freeing the gauge for removal from the rod tube 112 to complete the sequence of operation.

Figure 3:
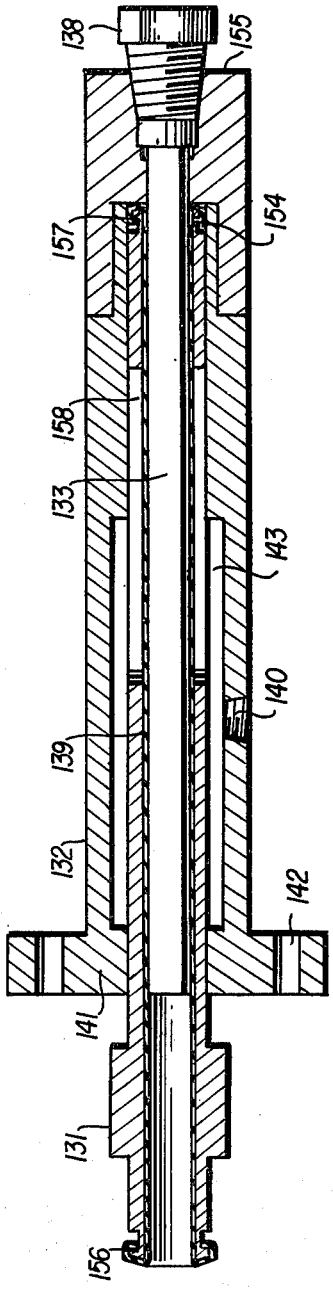
FIG. 3 is a longitudinal section of another embodiment of the apparatus of this invention.
Figure 4:
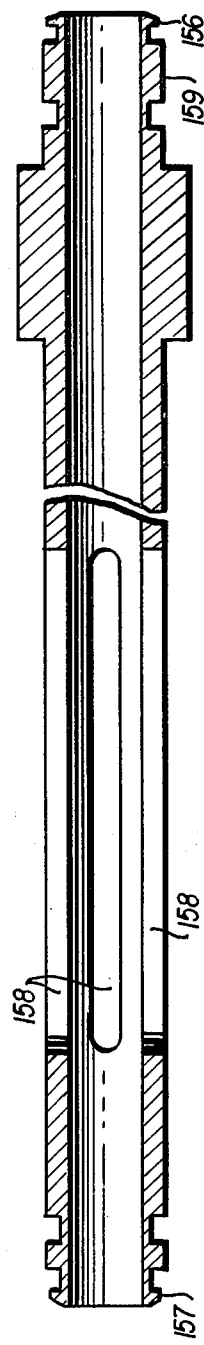
FIG. 4 is a longitudinal section of the encapsulating rod receptacle of the embodiment of the apparatus of this invention illustrated in FIG. 3.

An alternative embodiment of the adjustable length encapsulating pressure drop tester is illustrated in FIGS. 3 and 4 comprising a housing 132 having an enlarged front face 141, a longitudinal bore 154 extending between and communicating with the enlarged front face 141 and the rear face 155 of the housing, and a radial bore 140 for a pneumatic connection communicating with an enlarged section 143 of the longitudinal bore 154. The enlarged front face 141 is provided with longitudinal bores 142 to permit mounting of the housing 132 to a support structure, not shown.

An encapsulating rod receptacle 131 is slideably mounted in the longitudinal bore 154 of the housing. The encapsulating rod receptacle comprises a gauge tube having flanged ends 156, 157 and longitudinal slots 158 in its periphery. An extendible, air-impervious encapsulating sleeve 139 is mounted within the gauge tube 159 by stretching the ends of the sleeve over and around the flanged ends 156, 157 of the tube.

A rod stop 133 comprising a hollow cylindrical tube with a diameter approximating those of the rods to be tested is stationarily mounted in the main longitudinal bore 154 at the rear face 155 of the housing 132. The rod stop 133 extends the length of the longitudinal bore 154 slideably fitting within the extended air-impervious sleeve 139 of the encapsulating rod receptacle 131 to the front face 141 of the housing 132. The inside of the rod stop 133 communicates with a vacuum source, not shown, through a pneumatic connection 138 also mounted in the rear face 155 of the housing 132.

In operation, the apparatus of this invention utilizes controlled vacuum sources at both pneumatic connections 138, 140 of the encapsulating apparatus. A pressure drop measuring means is interposed between the pneumatic connection 138 to the rod stop 133 and its vacuum source. The controlled vacuum sources used at the pneumatic connections 138, 140 may, again, be two independent sources or one vacuum source operated alternatively to each of the connections as will be more fully described below as part of the description of the operation of the apparatus of this embodiment.

The pneumatic circuitry illustrated in FIG. 5 is equally applicable to this embodiment of the invention as for the embodiment initially discussed as are the steps of operation of the apparatus.

In this embodiment the adjustment of the encapsulating rod receptacle to accommodate the length of the rod being tested is accomplished by subjecting the outer surface of the extendible air-impervious encapsulating sleeve 139 to a suction force to release its air-tight contact with the rod stop 133. This is accomplished by opening the encapsulator operating valve 150 to the vacuum source 145 which operates to apply suction sequentially through the vacuum source line 152, the pneumatic connection 140, the chamber formed between the enlarged longitudinal bore 143 and the outer surface of the encapsulating rod receptacle 131 and the longitudinal slots 158 in the encapsulating rod receptacle 131 which results in the expansion of the air-impervious sleeve 139 against the associated inner surface of the gauge tube 159. This allows the slideable movement of the entire rod receptacle 131 in the longitudinal bore relative to both the stationary rod stop 133 and the housing face 141 to provide the appropriate available encapsulating length within the rod receptacle 131 for the rod being tested. This length is the distance between the exposed end of the rod receptacle, as at the flanged end 156 of the gauge tube and the outer end of the rod stop 133. As the rod receptacle is moved into the housing this length is decreased, as the rod receptacle is moved out of the housing this length is increased. In practice this length should be somewhat shorter than the actual length of the rod to allow for the encapsulation of all but a small portion of the rod protruding from the receptacle to facilitate removal.

The outer surface of the encapsulating rod receptacle 131 may be marked with calibrations to indicate the available encapsulating length within the rod receptacle for various positions of the rod receptacle in the housing so that when a calibration is aligned with the surface of the enlarged face 141 of the housing a corresponding encapsulating length will be available in the rod receptacle.

After the rod receptacle has been correctly positioned in the bore 154 for the length of rod being tested the rod is then inserted into the extended air impervious sleeve 139 of the rod receptacle 131 until it abuts the rod stop 133. The encapsulator operating valve 150 is then closed removing the suction and subjecting the extendible, air-impervious sleeve 139 to atmospheric pressure which results in its contraction against the rod being tested and the rod stop 133 to provide an air-tight seal along the entire length of the encapsulating rod receptacle.

To obtain the pressure drop measurement the pressure drop operating means 151 is opened subjecting the length of the rod being tested to a standard flow rate of air by suction acting through the vacuum source line 153, the pneumatic connection 138 and the rod stop 133 causing the pressure drop to be measured at the interposed monometer 148. After the pressure drop has been measured the pressure drop operating means 151 is closed and the encapsulator operating valve 150 opened which again operates to apply suction sequentially through the vacuum source line 152, the pneumatic connection 140, the chamber formed between the enlarged longitudinal bore 143 and the outer surface of the gauge tube 159 which results in the expansion of the air-impervious sleeve 139 against the inner surfaces of the gauge tube 159 freeing the rod for removal from the rod receptacle 131 to complete the sequence of operation.

Although the invention has been described in considerable detail with particular reference to certain preferred embodiments thereof, variations and modifications may be effected within the spirit and scope of the invention.

What is claimed is:

1. A variable length encapsulating pressure drop tester for measuring the pressure drop across the length of variable length tobacco smoke filters and similar variable length fluid permeable rod-shaped articles comprising
    a. a housing member having a longitudinal bore communicating with opposite ends of said housing,
    b. a first elongated apertured hollow member, which serves as a variable length rod holder, adjustably and slideably mounted in one end of said longitudinal bore,
    c. an extensible, air impervious sleeve mounted in said first hollow member,
    d. a second hollow member stationarily mounted in the second end of said longitudinal bore and extending into said bore and into said sleeve mount in said first hollow member,
    e. vacuum source means communicating with the outer surface of said air impervious sleeve, to expand said sleeve, whereby a rod-shaped article may be inserted into said sleeve,
    f. said vacuum source means communicating with said second hollow member, and
    g. means for measuring pressure drop interposed between said vacuum means and said second hollow.

2. The apparatus of claim 1 wherein the means for measuring pressure drop comprises a manometer.

3. A variable length encapsulating pressure drop tester for measuring the pressure across the length of variable length tobacco smoke filters or similar fluid permeable variable length rod-shaped articles comprising:
    a. a housing having a longitudinal bore extending between and communicating with opposite faces of said housing,
    b. a rod receptacle comprising a hollow cylindrical gauge tube and a radially apertured vacuum spool held in coaxial, spaced apart relationship by adapters mounted in each end of said gauge tube to form a hollow chamber between said tube and said spool, said rod receptacle being adjustably and slideably mounted in one end of said longitudinal bore,
    c. an extensible, air-impervious sleeve mounted within the vacuum spool of said rod receptacle.
    d. a rod receptacle comprising a hollow cylindrical tube stationarily mounted in said second end of said longitudinal bore and extending into said bore and said sleeve of said rod receptacle,
    e. vacuum source means communicating with the outer surface of said air impervious sleeve, to expand said sleeve, whereby a rod-shaped article may be inserted into said sleeve,
    f. said vacuum source means communicating with said rod stop,
    g. means for measuring pressure drop interposed between said vacuum means and said rod stop.

4. The apparatus of claim 3 wherein the means to expand said air-impervious sleeve comprises a vacuum source communicating with said hollow chamber formed by said gauge tube and said vacuum spool.

5. The apparatus of claim 3 wherein the means for measuring pressure drop comprises a manometer.

6. The apparatus of claim 3 further comprising a means for locking said rod receptacle in a stationary position in said bore of said housing.

7. The apparatus of claim 3 wherein said means for locking said rod receptacle in a stationary position in said bore of said housing comprises a screw threaded in a radial bore in said housing to enable locking contact with the rod receptacle.

8. The apparatus of claim 3 wherein the outer surface of the rod receptacle is calibrated to indicate the length of the rod being tested.

* * * * *

UNITED STATES PATENT OFFICE
CERTIFICATE OF CORRECTION

Patent No. 4,069,704　　　　　　　　　　Dated January 24, 1978

Inventor(s) James William Grant, Jr. et al.

It is certified that error appears in the above-identified patent and that said Letters Patent are hereby corrected as shown below:

Column 1, line 53, the word "alsp" should read -- also --.

Column 8, line 3, before the period, insert -- member --.

Column 8, line 44, the phrase "claim 3" should read -- claim 6 --.

Signed and Sealed this

*Twenty-sixth* Day of *September 197*

[SEAL]

*Attest:*

RUTH C. MASON
*Attesting Officer*

DONALD W. BANNER
*Commissioner of Patents and Trademark*